United States Patent
Tassitano

Patent Number: 5,628,964
Date of Patent: May 13, 1997

[54] MASTITIS DETECTING DEVICE

[76] Inventor: Henry Tassitano, R.D. 2 Box 213, Dunk Hill Rd., Walton, N.Y. 13856

[21] Appl. No.: 529,595

[22] Filed: Sep. 18, 1995

[51] Int. Cl.$^6$ ............................ A01S 5/013; A01S 5/04
[52] U.S. Cl. ............................ 422/101; 422/74; 99/460; 119/14.16; 119/DIG. 1
[58] Field of Search ............................ 422/101, 74, 73; 99/460; 119/14.16–14.18, 14.2, DIG. 1, 14.55

[56] References Cited

U.S. PATENT DOCUMENTS

| | | |
|---|---|---|
| 3,658,183 | 4/1972 | Best . |
| 3,954,625 | 5/1976 | Michalski . |
| 4,111,807 | 9/1978 | Boomus et al. . |
| 4,376,053 | 3/1983 | Bullock et al. . |
| 4,444,661 | 4/1984 | Jackson et al. . |
| 4,685,472 | 8/1987 | Muto . |
| 4,771,007 | 9/1988 | Tippetts et al. . |
| 5,096,575 | 3/1992 | Cosack . |
| 5,275,726 | 1/1994 | Feimer et al. . |

*Primary Examiner*—Lyle A. Alexander

[57] ABSTRACT

A device for detecting, in the early stages of infection, the presence of mastitis, as well as other impurities, in an individual cow or other milk producing animal, using a filter, preferably made of polyester and being disposable, which filters all milk being extracted from the cow, the filter being held in a container placed in the individual vacuum line of a milking machine being used to extract milk from the cow, the claws of the milking machine placed on the cow dropping from the cow upon the presence of mastitis, without contamination of the milk held in the bulk storage facility, while permitting healthy milk to pass through the filter without interruption of the milking process.

9 Claims, 3 Drawing Sheets

MASTITIS DETECTING DEVICE

BACKGROUND OF THE INVENTION

1. Field

This invention generally relates to mastitis in cows and is most particularly is concerned with a filter device located in the milk line of a milking machine to cause the claw of the milking machine to fall off the cow if the cow has only an early stage case of mastitis or the milk contains impurities from another source.

2. State of the Art

Mastitis is a major problem to the dairy industry costing millions of dollars in loss. Various approaches have been devised to avoid the problem and provide early detection but despite these efforts, the losses caused by mastitis continue. In the past, the use of filters in the milk line of the milking machine has been attempted as a possible solution to the problem. Unfortunately, such efforts have resulted in a solution which is just not workable for an active dairy farm.

In the Bullock et. al. Patent, U.S. Pat. No. 4,376,053, the history of in-line filters is set forth. Based upon that account, in 1969, an in-line clot detector was developed by the National Institute for research in dairying at Reading, England which detector consisted of a stainless steel mesh filter element molded into a 15 mm bore transparent polycarbonate tube at an angle of 45 degrees. The problem with this design is reported to have been quick blocking causing the claws which are placed on the udders of the cows to fall off without detecting mastitis. Obviously, for the cups to fall off upon detecting mastitis would be a benefit and not a detriment. It should be noted that the tube referred to was described as transparent indicating that visual observation of the filter was an essential part of the operation of the device which is not feasible in the operation of a modern dairy farm.

Apparently, prior to the above-described in-line filter, a clamshell type filter was tried but it did not provide good observation of the filter and had hygiene problems. Once again, visual observation was a stated feature of the invention.

The Bullock et al Patent, U.S. Pat. No. 4,376,053, recognized these failings and tried to overcome the problems. Once again, the filter was placed in a transparent container so once again visual observation was clearly a factor in making the invention work. Bullock et. al. wanted to avoid the problem of having the claws fall off the animal during the milking process, when clearly if the claws would fall off only when mastitis was present, there would be no concern with the interruption of the operation. Bullock et. al. taught four designs, but really there were two similar basic concepts with each of the concepts having two variations, one variation being a full wire mesh filter and the other being the same filter with an opening in it. Clearly, Bullock et. al. relied upon visual observation to detect mastitis and preferred to allow the milk of the cow to pass through the filter even if the milk was infected. In a milking barn, with milking occurring twice a day, it would neither be practical nor efficient to monitor all the filters. The invention contemplated by Bullock et. al. would permit detection sooner or later but later would most likely be most common. Certainly, if there was one infected cow, the entire quantity of milk collected would include mastitis infected milk and might be lost. Possibly for this reason, the use of this invention is not commonly known in the current dairy industry which still accepts as inevitable, huge monetary losses from mastitis.

What is needed by the dairy industry is a fail safe device which does require observation but which automatically stops the milking of a cow infected with mastitis even if the cow is only mildly infected but which does not shut down during normal milking operations of a healthy cow. It should also be noted that if mastitis can be detected at an early stage, the infected cow can be cured much more quickly and returned to production. Thus, there is a need not only for sufficiently rapid detection of infected milk without the need visually to monitor the flow so as to avoid contamination of the entire bulk tank supply but also to identify the diseased animal sufficiently early to permit a rapid cure.

The invention as described herein permits fail-safe detection without any need for visual observation but which rather automatically releases and terminates vacuum pressure and causes interruption of the milking process even with a mildly infected cow by causing the claws to drop from the infected animal which was the very concern of the prior art. This is made possible by use of a filter which does not cause the claws to drop when the milk is wholesome. The filter, being readily replaceable and disposable, insures proper hygiene and prompt continuation of the milking process.

SUMMARY OF THE PRESENT INVENTION

The present invention provides a filter detector which meets these results by placing a disposable filter in a container which permits wholesome milk to pass but immediately plugs up with milk infected with mastitis. The container can be made of any structurally sound material which is sufficiently hygienic. Stainless steel or a hard plastic will suffice. There is no need for transparency or even translucency. The container can be formed in any number of ways but a design which permits ready opening and closing for filter installation and removal is very important. The filter is placed in the individual milk line of the milking machine downstream of the claws but upstream of the juncture point where milk from any other cow would commingle with the milk being monitored.

The container with the filter is placed in the milk line so an inlet and an outlet compatible with such line is essential. The container, which is preferably round, requires an internal diameter substantially larger than the internal diameter of the milk line itself. A reservoir is provided on the upstream side of the filter and a reservoir is also provided on the downstream side of the filter. The container is formed in two parts which fit together to hold the filter in place across the entire path of flow.

The filter is a polyester material having a Frazier Air Permeability in the range of 450 cfm to 600 cfm. The filter is preferably placed generally at right angles to the line of flow and is sealed in the container across the entire flow.

THE DRAWINGS

In the accompanying drawings, which illustrate an embodiment of the device constituting the best mode presently contemplated of carrying out the invention in actual practice:

DETAILED DESCRIPTION OF THE INVENTION

Figure 1:
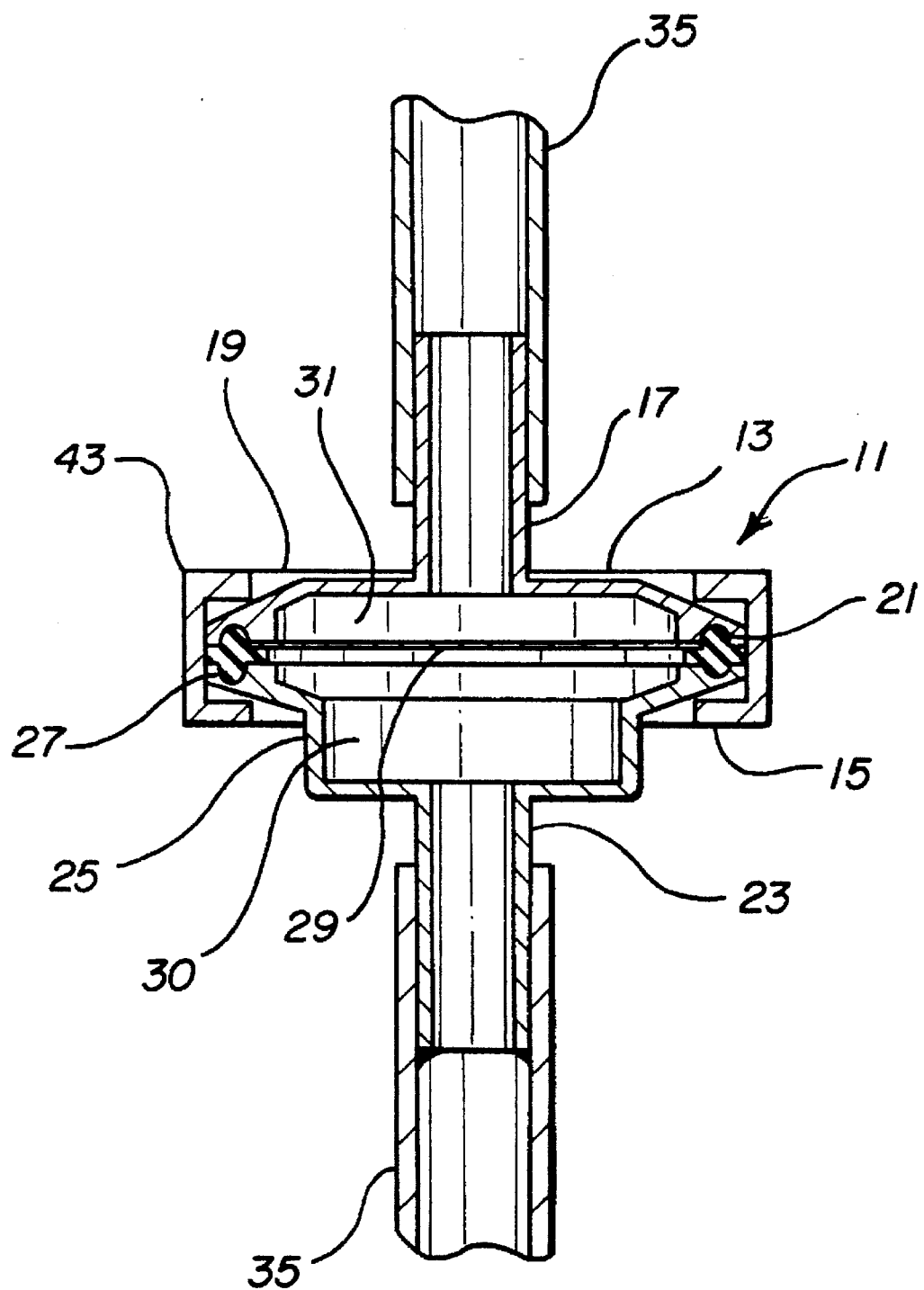
FIG. 1 is cross-sectional view along the longitudinal axis of the filter container showing the filter in place within the container.

Referring now to FIG. 1, a filter container 11 is shown having an upper section 13 and a lower section 15. The upper section 13 includes an upper tube connector 17 and an upper housing 19. The upper tube connector 17 extends substantially at right angles from the center of the upper housing 19. The upper tube connector 17 is cylindrical as is the upper housing 19. The upper housing 19 includes an upper rim 21. The lower section 15 includes a lower tube connector 23 and a lower housing 25. The lower tube connector 23 extends substantially at right angles from the center of the lower housing 25. The lower housing 25 includes a lower rim 27. A filter 29 is located between the upper rim 21 and the lower rim 27. The lower section 15 forms a reservoir 30 downstream of the filter 29. The upper section 13 forms a reservoir 31 upstream of the filter 29. The filter 29 and the filter container 11 and thus both the upper housing 19 and the lower housing 25 are cylindrical and the diameter of the upper rim 21 and the lower rim 27 are substantially the same so that the upper rim 21 and the lower rim 27 mate with one another to form a seal. An O-ring 32 is placed between the upper rim 21 and the lower rim 27 and both the upper rim 21 and the lower rim 27 have an indentation 39 to accommodate the O-ring 32.

Figure 4:
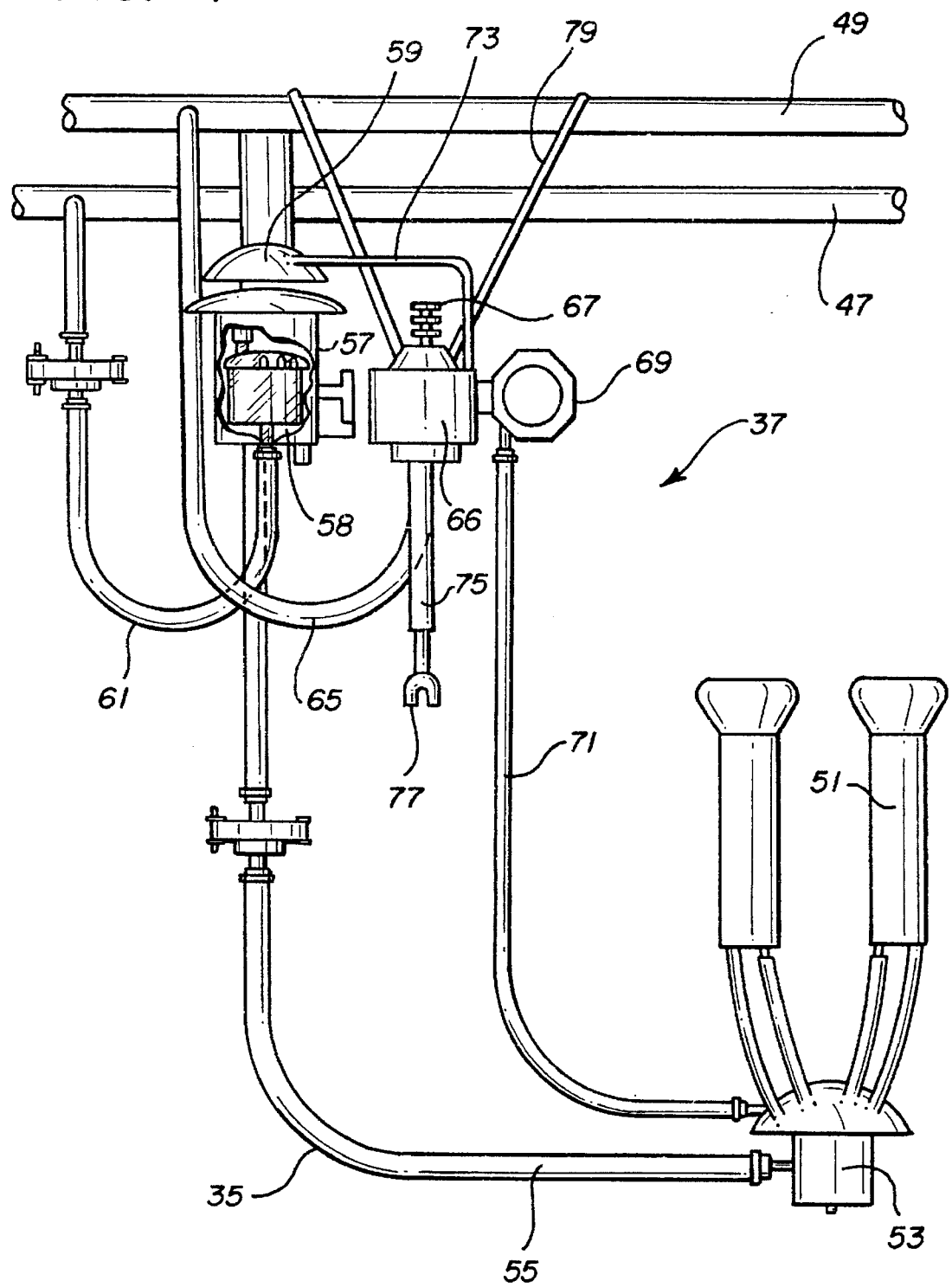
FIG. 4 is a front elevation of a milking machine of known design with the filter container in place in the milk line of the milking machine.

The upper tube connector 17 and the lower tube connector 23 are sized to fit securely into the interior of a milk line 35 of a standard milking machine 37. As is best seen in FIG. 4, the milking machine 37 will be briefly described hereinafter. Milk flows from the cow being milked into the upper housing 19. The upper housing 19, which as previously stated forms a reservoir 31, permits the milk to spread out over the filter 29. The milk passes through the filter 29 into the reservoir 30 in the lower housing 25.

Figure 2:
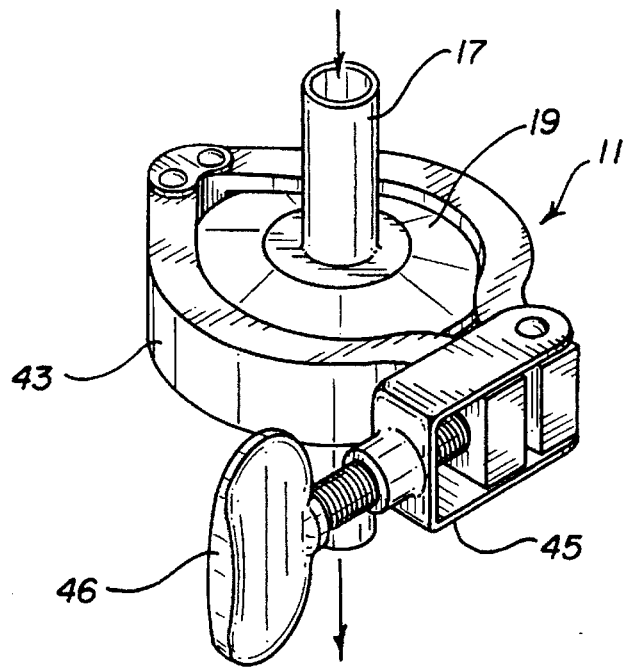
FIG. 2 is a pictorial view of the filter container showing the filter container with the expandable clamp used to hold the two sections of the container together.
Figure 3:
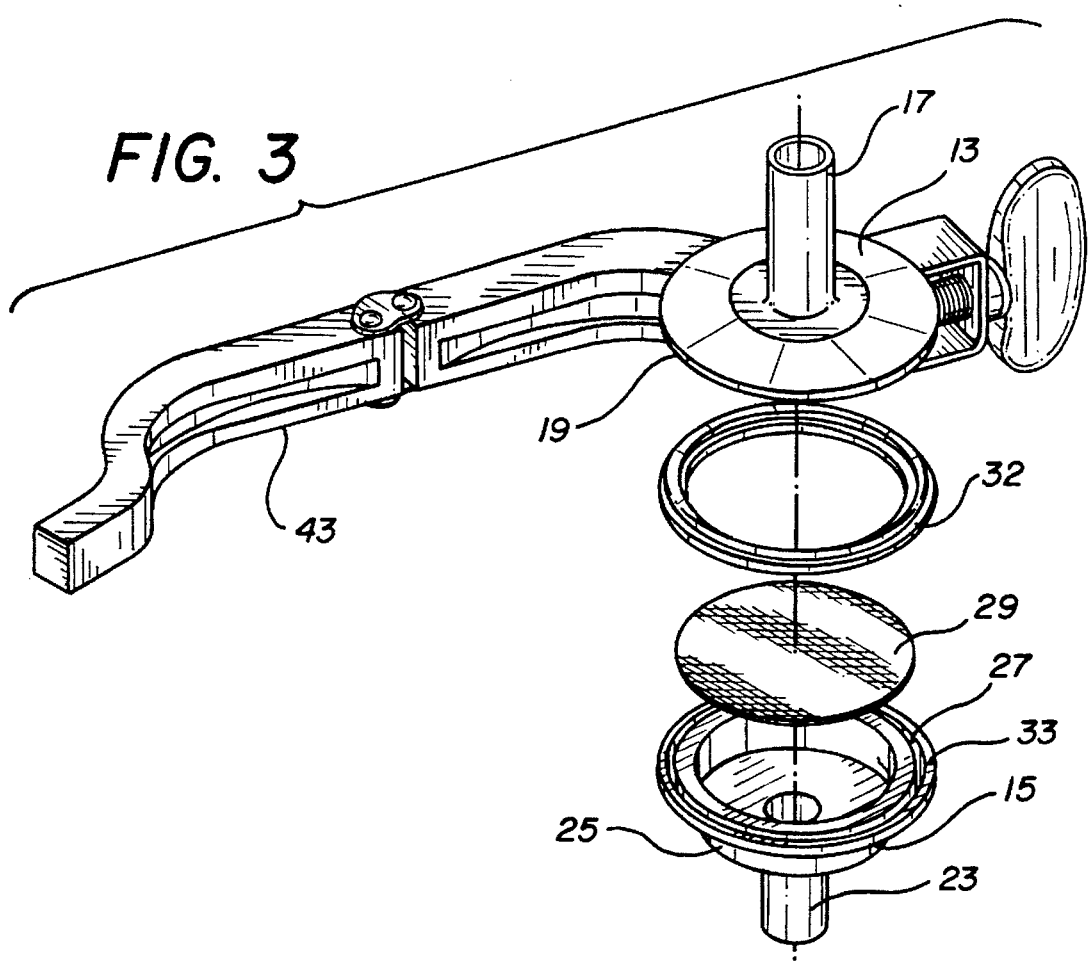
FIG. 3 is an exploded view of the filter container showing the two sections of the container and the O-ring as well as the filter and the expandable clamp used to hold the two sections together.

As best seen in FIG. 3, in assembling the filter container 11, the filter 29 is placed on the lower rim 27 of the lower housing 25. The filter 29, which is circular, has a diameter substantially the same as the upper rim 21 and the lower rim 27. The O-ring 32 is placed on top of the filter 29 and then the upper rim 21 is placed down on the O-ring 32. The O-ring 32 forces the filter 29 into the indentation 39 in the lower rim 27 of the lower section 15. As best seen in FIGS. 2 and 3, a clamp 43 which is pivotal is mounted around the upper rim 21 and the lower rim 27. The clamp 43 includes a lock 45 with a thumb screw 46 which forces the clamp 43 about the upper section 13 and lower section 15 and also forces the upper rim 21 and the lower rim 27 of the filter container 11 together, forming a tight seal between the upper section 13 and the lower section 15.

The filter 29 has specifications as follows:

FEATURES: Round, Straight, Non-whitened Homopolymer Fibers (excluding binder)
PRODUCT: Soundbonded Polyester
DESCRIPTIVE/TYPE: 2214, 1.35 oz/sq. yd, 2.2 dpf.

| PROPERTY | OBSERVED VALUE | | | ASTM STD. |
|---|---|---|---|---|
| | Nominal | Low | High | |
| TENSILE STRENGTH: | | | | |
| (Grab, MD), lb/in. | 31.8 | 21.8 | 41.8 | 01682 |
| (Grab, XD), lb/in. | 30.0 | 25.0 | 35.0 | 01682 |
| UNIT WEIGHT, oz/sq yd | 1.35 | 1.30 | 1.40 | 03776 |
| COLOR "b" (Hunter, Wine) | 2.6 | 1.6 | 3.6 | 02244 |
| FUZZ RATING (1–5) | | | | |
| Jet Sheet Avg. | 4.0 | 3.5 | — | |
| Belt Sheet Avg. | 3.4 | 2.5 | — | |
| Low Jet Channel | 3.3 | 2.7 | — | |
| Low Belt Channel | 2.8 | 2.0 | — | |
| FRAZIER AIR PERMEABILITY, cfm | 521 | 461 | 581 | 0737 |
| THICKNESS, mils | 8.7 | 8.1 | 9.3 | 01777 |

Such filters are made by more than one manufacturer but a filter having a Frazier Air Permeability in the range of 450 cfm to 600 cfm provides the required passage of milk to prevent blockage during the flow of healthy milk while quickly stopping operation if milk infected with mastitis or other impurities enters the filter.

FIG. 4 shows a milking machine 37 of the type used in stanchion barns but the basic operation of milking machines, regardless of the exact style is essentially the same and certainly the use of the mastitis detecting device is the same regardless of manufacture or model of the milking machine 37. In FIG. 4, in addition to the milking machine 37 itself, there is shown a bulk milk line 47 and a bulk vacuum line 49 which are installed in the milking barn and connect the milking machine 37 to a bulk tank (not shown). The milking machine 37 includes claws 51 which are mounted on a milking unit 53. As is well known, the claws 51 are placed on the udders of a cow and by a pulsating suction induce the flow of milk and withdraw the milk through an upstream section 55 of the milk line 35 to a milk flow sensor 57 having a regulator 59 mounted thereon. A container 58, is located within the milk flow sensor 57. The milk flows from the milk flow sensor 57 through a downstream section 61 of the milk line 35 to the bulk milk line 47. A supply vacuum line 65 extends from the bulk vacuum line 49 to a flow control unit 66. Mounted on the flow control unit 66 is a bellows 67 and mounted on the side of the control unit 66 is a pulsator 69. An air line 71 extends from the pulsator 69 to the milking unit 53. A regulator tube 73 extends from the regulator 59 to the flow control unit 66. A handle 75 with a mounting means 77 is located on the base of the flow control unit 66. Hangers 79 are provided to mount the milking machine 37 on the bulk vacuum line 49.

The milking machine 37 forces the milk through the upstream section 55 of the milk line 35. The filter 29 must be located between the control unit 53 and the bulk milk line 47 since detection must occur before the milk commingles with milk from other animals. The filter container 11 is preferably placed in the upstream section 55 of the milk line 35 a short distance downstream from the milking unit 53 and a separate filter container 11 permits easy access to the filter 29. The filter container 11 may have various configurations but the filter 29, if circular, should have a diameter in the range of 1.50 inches to 3.50 inches. Normally, the internal diameter of the milk line is ⅝ inches. Thus it has been found that the ratio of the diameter of the filter 29 is in the range of 2.5 to 5.5 times the diameter of the cross section of the milk line 35. The filter container 11 must meet these limitations and not leak. A filter container 11 which can be readily opened and closed is a definite positive factor and the clamp 43 readily meets that requirement. However, it would be possible for the filter 29 to be placed in the milk flow sensor 57 and be made a part thereof, in which event, the filter container 11 becomes coextensive with the container 58 within the milk flow sensor 57.

Thus, while a preferred embodiment of the invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A mastitis detecting device for use with a milking machine having a milk line feeding milk from a milk producing animal to a bulk milk line and further having claws for attachment to the udders of a milk producing animal for the purpose of milking same, said mastitis detecting device including:

a filter container located in the milk line of a milking machine between the claws of the milking machine and the bulk milk line; and a filter mounted within the filter container, said filter being made from polyester with a Frazier Air Permeability in the range of 450 cfm to 600 cfm and being disposable and having a cross-sectional area larger than the cross-sectional area of the milk line wherein mastitis is detected by mastitic clots clogging the filter causing the claw to drop from the animal.

2. A mastitis detecting device according to claim 1 wherein the filter is circular and the cross section of the milk line is also circular and wherein the diameter of the filter is in the range of 2.5 to 5.5 times the diameter of the cross section of the milk line.

3. A mastitis detecting device according to claim 1 wherein the filter includes round, straight, non-whitened homopolymer fibers.

4. A mastitis detecting device according to claim 1 wherein the filter container has an upper section and a lower section, the upper section and the lower section having a circular cross-section, the upper section having an upper rim and the lower section having a lower rim, the upper rim and the lower rim having substantially the same diameter, the upper section having an upper tube extending from the upper section and the lower section having a lower tube extending from the lower section, the filter being located between the upper section and the lower section.

5. A mastitis detecting device for use with a milking machine having a milk line feeding milk from a milk producing animal for milking same, said mastitis detecting device including:

a filter container located in the milk line of a milking machine between the claws of the milking machine and the bulk milk line, the filter container having as upper section with an upper connector tube and a lower section with a lower connector tube, both the upper section and the lower section having a circular cross section, the milk line being connected to both the upper connector tube and the lower connector tube, the upper section having an upper rim and the lower section having a lower rim, the upper rim and the lower rim having substantially the same diameter;

a filter located within the filter container between the lower rim and the upper rim, said filter being formed from a polyester and having a Frazier Air Permeability in the range of 450 cfm to 600 cfm; and means for pressing the upper rim and the lower rim together against the filter wherein mastitis is detected by mastitic clots clogging the filter causing the claw to drop from the animal.

6. A mastitis detecting device for use with a milking machine having a milk line feeding milk from a milk producing animal to a bulk line and further having claws for attachment to the udders of the milk producing animal for milking same, said mastitis detecting device including:

a filter container located in the milk line of a milking machine between the claws of the milking machine and the bulk milk line; and a filter located within the filter container across the flow of milk, said filter being formed from sound-bonded polyester and having round, straight, non-whitened homopolymer fibers with a Frazier Air Permeability in the range of 450 cfm to 600 cfm wherein mastitis is detected by mastitic clots clogging the filter causing the claw to drop from the animal.

7. A mastitis detecting device according to claim 6 wherein the filter is circular and the cross section of the milk line is also circular and wherein the diameter of the filter is in the range of 2.5 to 5.5 times the diameter of the cross section of the milk line.

8. A mastitis detecting device according to claim 6 wherein the filter container has an upper section and a lower section, the upper section and the lower section having a circular cross section, the upper section having a rim and the lower section having a rim, the upper rim and the lower rim having the same diameter, the upper section having an upper tube extending from the upper section and the lower section having a lower tube extending from the lower section, the milk line being connected to the upper tube and the lower tube; and a clamping means for securing the upper section to the lower section, the filter being located between the upper section and the lower section.

9. A mastitis detecting device according to claim 6 wherein the thickness of the filter is in the range of 8.1 mils to 9.3 mils.

* * * * *